UNITED STATES PATENT OFFICE.

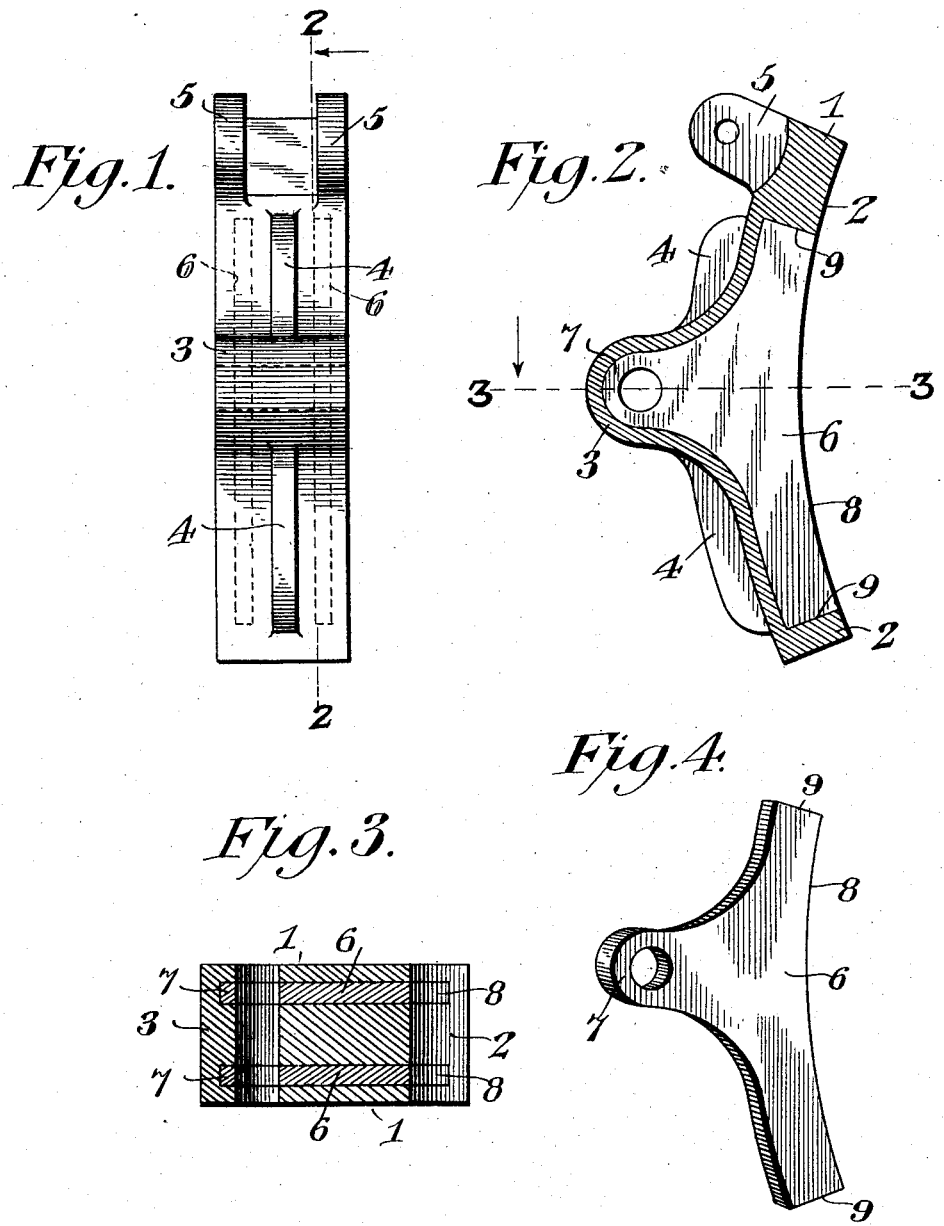

CHARLES V. MARQUART, OF SANDUSKY, OHIO.

BRAKE-SHOE.

1,054,974.      Specification of Letters Patent.      Patented Mar. 4, 1913.

Application filed June 4, 1912. Serial No. 701,524.

*To all whom it may concern:*

Be it known that I, CHARLES V. MARQUART, a citizen of the United States, residing at Sandusky, in the county of Erie and State of Ohio, have invented a new and useful Brake-Shoe, of which the following is a specification.

This invention has reference to improvements in brake shoes, and its object is to provide a brake shoe of superior strength with respect to brake shoes as ordinarily constructed, and also of superior wearing qualities, whereby the life of the brake shoe is correspondingly prolonged and the amount of metal which must ultimately be scraped is reduced to a minimum.

To this end the brake shoe of the present invention which may follow the usual outlines of brake shoes or may be specially shaped, comprises a body portion of cast metal in which there are embedded plates of tough steel disposed substantially perpendicular to the wearing face of the brake shoe, and while exposed at such wearing face the steel plates are otherwise entirely embedded in the body of the shoe and are sufficiently extensive to include the usual eye projecting from the rear face of the brake shoe for attachment to the brake beam.

The invention will be best understood from a consideration of the following detailed description, taken in connection with the accompanying drawings forming a part of this specification, with the further understanding that while the drawings show a practical embodiment of the invention it may be otherwise embodied, wherefore the invention is not confined to any exact conformity with the showing of the drawings, but may be changed and modified in its practical embodiments so long as such changes and modifications mark no material departure from the salient features of the invention.

In the drawings:—Figure 1 is an elevation of a brake shoe constructed in accordance with the present invention showing the face thereof remote from the working face. Fig. 2 is a section on the line 2—2 of Fig. 1. Fig. 3 is a section on the line 3—3 of Fig. 2. Fig. 4 is a perspective view of one of the inserts.

Referring to the drawings, there is shown a brake shoe 1 provided with a wear face 2 and on the side opposite the wear face an eye 3 by means of which the brake shoe may be connected to a brake beam. Furthermore, on the face of the brake shoe provided with the eye 3 there may be provided strengthening webs 4 and in the particular brake shoe illustrated in the drawings there are provided on the same face as the webs 4, spaced ears 5, for the reception of a suspending link as is customary. The brake shoe of the present invention while of more or less general application is designed more particularly for use in connection with the brake beam illustrated in Letters Patent No. 994,323, granted to me on June 6, 1911.

The brake shoe of the present invention is provided with two inserts 6 in the form of elongated tough steel plates of less length than the body of the brake shoe and each provided with a side extension in the form of an eye 7 matching but less extensive than the eye 3 of the body of the brake shoe. Both eyes 3 and 7 are provided with matching perforations and the inserts 6 are spaced apart so as to be lodged on opposite sides of the center line of the brake shoe about midway between such center line and the side edges of the brake shoe, while each insert is provided with a wearing edge 8 conforming to the wearing edge 2 of the brake shoe and there exposed, said inserts being each in edge relation to the wearing face of the shoe, that is, substantially perpendicular to such wearing face.

The wearing face 2 of the brake shoe is curved as is customary on a radius conforming to a radius of the wheel to which the shoe is to be applied and the wearing edge 8 of each insert plate 6 is correspondingly curved, while the ends of each plate 6 are substantially radial to the axis of curvature of the edge 8, these ends being indicated at 9. The body 1 of the shoe is cast around the plates 6 with the eye portions 7 extending into the eye 3 and the ends 9 because of their disposition serve to lock the inserts 6 in the body 1 against danger of loosening and displacement. At the same time the tough material of which the plates 6 are formed greatly strengthens both the body 1 and the eye 3, wherefore liability of breakage is reduced to a minimum. Moreover, the frictional engagement of the brake shoe with the tread of the wheel to which the brake shoe is applied is increased by the employment of metals of different character in the wearing face and even though the brake shoe be worn to a thinness which would render an all-cast brake shoe useless, the life of the brake shoe of the present invention is much prolonged with respect to the ordinary all-cast brake shoe because of the presence of the inserts 6 set perpendicular to the wearing edge of the brake shoe and in planes parallel with the longitudinal center line of the brake shoe.

While the number of inserts which may be employed is not limited necessarily to two, such number is usually found sufficient and efficient. The inserts are most readily formed of sheet steel and may be punched or cut out of steel plates of appropriate gage.

What is claimed is:—

1. A brake shoe of cast metal having an eye on the face thereof remote from the wear face of the shoe and also having spaced steel plates or inserts lodged therein in edge relation to and extending from the active face of the shoe into the eye in surrounding relation to the passage through the eye.

2. A brake shoe of cast metal having spaced steel plates therein, each plate having an edge conforming to and exposed at the wear edge of the shoe, and with end portions in substantially radial relation to the curvature of the wear edge of the shoe, said shoe being provided at the face remote from the wear edge with an eye and each plate having an eye extension into the eye of the shoe, each plate being entirely embedded in the shoe except at the wear face thereof.

3. A brake shoe having a cast metal body at one edge curved to constitute a wear face and remote therefrom provided with an intermediate eye and at one end with spaced ears and in the center line of the body member having strengthening ribs on the portion of the body member remote from the wear face, and reinforcing plates of different character from the body member of the shoe and of less length than such body member, said wear plates having a wear edge conforming in curvature with and exposed at the wear face of the shoe and with ends in locking relation to the shoe, each wear plate being provided with an eye extension entering the eye of the shoe and embedded therein.

In testimony, that I claim the foregoing as my own, I have hereto affixed my signature in the presence of two witnesses.

CHARLES V. MARQUART.

Witnesses:
J. J. CORNELIUS,
JOHN C. ERNST.

Copies of this patent may be obtained for five cents each, by addressing the "Commissioner of Patents, Washington, D. C."